US010038533B2

(12) United States Patent
Wang et al.

(10) Patent No.: US 10,038,533 B2
(45) Date of Patent: Jul. 31, 2018

(54) PILOT FREQUENCY POSITION DETERMINING METHOD BASED ON PILOT FREQUENCY INTERVAL OPTIMIZATION, AND TRANSCEIVER DEVICE

(71) Applicant: ZTE Wavetone Science and Technology Ltd., Nanjing, Jiangsu (CN)

(72) Inventors: Haiming Wang, Jiangsu (CN); Lin Tian, Jiangsu (CN); Shiwen He, Jiangsu (CN); Yu Wang, Jiangsu (CN); Yongming Huang, Jiangsu (CN); Jun Zhang, Jiangsu (CN)

(73) Assignee: ZTE Wavetone Science and Technology Ltd., Nanjing, Jiangsu (CN)

( * ) Notice: Subject to any disclaimer, the term of this patent is extended or adjusted under 35 U.S.C. 154(b) by 20 days.

(21) Appl. No.: 15/508,159

(22) PCT Filed: Jan. 20, 2015

(86) PCT No.: PCT/CN2015/071094
§ 371 (c)(1),
(2) Date: Mar. 2, 2017

(87) PCT Pub. No.: WO2016/033930
PCT Pub. Date: Mar. 10, 2016

(65) Prior Publication Data
US 2017/0264411 A1  Sep. 14, 2017

(30) Foreign Application Priority Data
Sep. 5, 2014 (CN) .......................... 2014 1 0452513

(51) Int. Cl.
H04W 72/04 (2009.01)
H04L 5/00 (2006.01)
(Continued)

(52) U.S. Cl.
CPC .......... H04L 5/0048 (2013.01); H04L 5/0007 (2013.01); H04L 25/0226 (2013.01);
(Continued)

(58) Field of Classification Search
CPC .......... H04L 5/00; H04L 25/02; H04W 72/04; H04W 84/12
See application file for complete search history.

(56) References Cited

U.S. PATENT DOCUMENTS

2005/0100110 A1* 5/2005 Pietraski ............. H04L 27/3809
375/264
2007/0087749 A1* 4/2007 Ionescu .................... H04B 7/04
455/436
(Continued)

FOREIGN PATENT DOCUMENTS

CN 1905546 1/2007
CN 101682588 3/2010
CN 103685085 3/2014

OTHER PUBLICATIONS

International Search Report of PCT/CN2015/071094 dated Jun. 10, 2015, 4 pages (English and Chinese).

Primary Examiner — Andrew Lee
(74) Attorney, Agent, or Firm — Rankin, Hill & Clark LLP

(57) ABSTRACT

The present invention discloses a pilot frequency position determining method based on pilot frequency interval optimization and a transceiver device. The method optimizes a pilot frequency position on the basis of better use of pilot frequency in a wireless system for sampling frequency synchronization and residual phase tracking. After an optimal pilot frequency position is obtained according to the method, a transmitting terminal inserts a pilot frequency sequence at a corresponding pilot frequency position, a receiving terminal learns the pilot frequency position and the
(Continued)

pilot frequency sequence, and after channel equalization, deviation is tracked by means of coherent detection of a local sequence. For the aforementioned method, the present invention further provides a transceiver device of a related pilot frequency module in the wireless system. The pilot frequency position can be better determined without increasing system complexity, and the present invention significantly improves the system performance.

5 Claims, 5 Drawing Sheets

(51) Int. Cl.
H04L 25/02 (2006.01)
H04W 84/12 (2009.01)
(52) U.S. Cl.
CPC ..... *H04L 25/0256* (2013.01); *H04W 72/0453* (2013.01); *H04W 84/12* (2013.01)

(56) References Cited

U.S. PATENT DOCUMENTS

| 2010/0271263 | A1* | 10/2010 | Moshfeghi | G01S 5/0263 342/378 |
| 2010/0309051 | A1* | 12/2010 | Moshfeghi | H04W 4/029 342/378 |
| 2013/0016649 | A1* | 1/2013 | Damnjanovic | H04W 88/04 370/315 |
| 2013/0272443 | A1* | 10/2013 | Subramanian | H04L 5/0048 375/295 |
| 2014/0211680 | A1* | 7/2014 | Seok | H04W 52/0216 370/311 |
| 2015/0358183 | A1* | 12/2015 | Soga | H03M 13/6527 370/329 |
| 2017/0214506 | A1* | 7/2017 | Lee | H04L 5/0048 |
| 2017/0295159 | A1* | 10/2017 | Arora | H04L 63/083 |

* cited by examiner

PILOT FREQUENCY POSITION DETERMINING METHOD BASED ON PILOT FREQUENCY INTERVAL OPTIMIZATION, AND TRANSCEIVER DEVICE

FIELD OF THE INVENTION

The present invention relates to a pilot frequency position determining method based on pilot frequency interval optimization and a transceiver device, and belongs to the technical field of wireless communication systems.

BACKGROUND

In a wireless local area network (Wireless Local Area Network, WLAN) institute of electrical and electronic engineers (Institute of Electrical and Electronic Engineers, IEEE) 802.11 orthogonal frequency division multiplexing (Orthogonal Frequency Division Multiplexing, OFDM) system, a pilot frequency is mainly used for carrying out sampling frequency synchronization and residual phase tracking. A receiving terminal will produce a fractional offset in the sampling, sampling frequency correction must be carried out in the frequency domain by the pilot frequency, the data after carrier frequency offset correction still has certain residual deviations, these residual deviations will cause a phase shift of the data, and residual phase tracking is carried out by the pilot frequency. The sampling frequency deviation on a pilot frequency subcarrier is equivalent to the sampling of the frequency deviation on each subcarrier, and on the premise of the same sample number and equal intervals, the more uniform the sample sampling distribution is, the better the overall actual situation can be represented.

Due to the presence of null subcarriers in the IEEE 802.11 system, the pilot frequencies are non-uniformly inserted, but the interval between the pilot frequencies is consistent or is selected on the basis of the consistent interval. In the IEEE 802.11ad protocol (2.16 GHz bandwidth), there are 512 subcarriers in total in each OFDM symbol, which are distributed on −256 to 255 positions, wherein there are 16 pilot frequency subcarriers, the positions thereof are respectively {±10, ±30, ±50, ±70, ±90, ±110, ±130, ±150}, and the interval of the pilot frequency subcarriers is 20.

In the IEEE 802.11 OFDM system, the pilot frequency is mainly used for carrying out sampling frequency synchronization and residual phase tracking. The smaller the difference between an estimated sampling frequency deviation and a pre-added sampling frequency deviation is, the smaller the difference between a residual phase deviation and a pre-added residual phase deviation is, the more accurate the estimation is, and the improvement of performance is reflected in the wireless system.

BRIEF DESCRIPTION

The technical problem to be solved in the present invention is to provide a method for optimizing a pilot frequency position based on pilot frequency intervals and a transceiver device, so that a sampling frequency deviation can be estimated more accurately, the pilot frequency position is adjusted to better carry out sampling frequency synchronization and residual phase tracking, and the system performance is further improved without influencing the system throughput.

To solve the aforementioned technical problem, the present invention adopts the following technical solutions:

On one aspect, the present invention provides a pilot frequency position determining method based on pilot frequency interval optimization, including the following steps:

step 1, determining a value set of pilot frequency intervals according to the distribution condition of subcarriers in an IEEE 802.11 system;

step 2, obtaining corresponding pilot frequency position sequences and a set thereof for the pilot frequency intervals in the value set of pilot frequency intervals in step 1;

step 3, obtaining a direct product of the value set of pilot frequency deviations and the pilot frequency position sequence set in step 2, estimating sampling frequency deviations and residual phase deviations of spatial data flows, and counting normalized mean squared errors of the sampling frequency deviations; and step 4, selecting a pilot frequency interval which ensures a minimum normalized mean squared error of the sampling frequency deviations in step 3 from the value set of pilot frequency intervals in step 1, wherein the pilot frequency position sequence in the pilot frequency position sequence set corresponding to the pilot frequency interval is an optimal pilot frequency position sequence.

As a further optimized solution of the present invention, the specific steps of the aforementioned pilot frequency position determining method based on pilot frequency interval optimization are as follows:

step 1, determining the value set of pilot frequency intervals according to the distribution condition of the subcarriers in the IEEE 802.11 system, specifically includes:

obtaining the value set $D=\{d_1, d_2, \ldots, d_m\}$ of pilot frequency intervals d within a value range $$\left\{ d \,\middle|\, N_{DC}+1 \le d \le \left\lfloor \frac{N_{SP}+N_{SD}+N_{DC}-1}{N_{SP}-1} \right\rfloor, d\bmod 2 = 0 \right\},$$

wherein d expresses a pilot frequency subcarrier interval, $t=1,2,\ldots,m$, and m expresses the number of elements of the set D; $N_{DC}$ expresses the number of DC null subcarriers, $N_{SP}$ expresses the number of pilot frequency subcarriers, and $N_{SD}$ expresses the number of data subcarriers in each OFDM symbol; $\lfloor \cdot \rfloor$ expresses round down; and mod2 expresses a remainder of dividing 2;

step 2, obtaining the corresponding pilot frequency position sequences and the set thereof for the pilot frequency intervals in the value set of pilot frequency intervals in step 1, specifically includes:

expressing a pilot frequency subcarrier position $k_i$ by the pilot frequency interval d on the condition that pilot frequencies are symmetrically distributed on a subcarrier sequence at equal intervals as $$k_i = \left(i - \frac{N_{SP}+1}{2}\right)d,$$

$i=1,2,\ldots,N_{SP}$, and then obtaining a corresponding pilot frequency position sequence $b_t=[k_1,k_2,\ldots,k_{N_{SP}}]$ for $\forall d_t \in D$, wherein the pilot frequency position sequence set is $B=\{b_1, b_2, \ldots, b_m\}$, and the number of elements of the set B is equal to the number of the elements of the set D;

the step 3, obtaining the direct product of the value set of pilot frequency deviations and the pilot frequency position sequence set in step 2, estimating the sampling frequency deviations and the residual phase deviations of the spatial data flows, and counting the normalized mean squared errors of the sampling frequency deviations, specifically includes:

setting the value set of the sampling frequency deviations $\tilde{\omega}$ as $S=\{s_1, s_2, \ldots, s_n\}$, wherein $S_1$ expresses a random value of $\tilde{\omega}$ on Gaussian distribution in which a mean is 0 and a variance is $\sigma^2$, the value range of $\mathcal{H}$ is $[-\frac{1}{2}, \frac{1}{2}]$, n expresses the number of the elements of the set S, and l=1, 2, ... n; the direct product of S and B is expressed as $S \times B = \{(s_l, b_t) | \forall s_l \in S \mathcal{H} b_t \in B\}$, and then each element in $S \times B$ corresponds to a combination of a sampling frequency deviation and a frequency position sequence selected in simulation, estimating the sampling frequency deviations and the residual phase deviations of the spatial data flows, and counting the normalized mean squared errors of the sampling frequency deviations; and step 4, selecting the pilot frequency interval which ensures the minimum normalized mean squared error of the sampling frequency deviations in step 3 from the value set D of pilot frequency intervals in step 1, wherein the pilot frequency position sequence in the pilot frequency position sequence set B corresponding to the pilot frequency interval is the optimal pilot frequency position sequence.

As a further optimized solution of the present invention, the estimating the sampling frequency deviations and the residual phase deviations of the spatial data flows in step 3 is specifically as follows:

on the condition of not considering noise influence, the pilot frequency sequence sent by a transmitting terminal is set as $$x = [x_{k_1}, \ldots x_{k_i} \ldots, x_{k_{N_{SP}}}],$$

and the pilot frequency sequence received by a receiving terminal is set as $$y = [y_{k_1}, \ldots y_{k_i} \ldots, y_{k_{N_{SP}}}],$$

wherein $k_i$ expresses a pilot frequency subcarrier position, namely the corresponding position of the $i^{th}$ pilot frequency is the $k^{th}$ subcarrier, $h_{k_i}$ expresses a corresponding frequency domain channel, and then a model of the sampling frequency deviation $\tilde{\omega}$ and the residual phase deviation $\tilde{\varphi}$ on the $k_i^{th}$ pilot frequency subcarrier is as follows:

$$y_{k_i} = h_{k_i} x_{k_i} e^{j\left(\frac{2\pi}{N_{FFT}} \tilde{\omega} k_i + \tilde{\varphi}\right)}, i = 1, 2, \ldots, N_{SP} \quad (1)$$

wherein, $N_{FFT}$ expresses the number of subcarriers in one OFDM symbol; j is an imaginary number;

after channel equalization, the phase deviation obtained by coherent detection at the pilot frequency subcarrier is:

$$\tilde{\theta}_{k_i} = \angle(h_{k_i}^{-1} y_{k_i} x_{k_i}^*) \ i = 1, 2, \ldots, N_{SP} \quad (2)$$

wherein, $$\tilde{\theta}_{k_i} = \frac{2\pi}{N_{FFT}} \tilde{\omega} k_i + \tilde{\varphi},$$

$\angle$ expresses figuring out a phase value, $(\cdot)^{-1}$ expresses inversion, and $(\cdot)^*$ expresses figuring out conjugation;

for $N_{SP}$ pilot frequency subcarriers, $$\tilde{\theta} = [\tilde{\theta}_{k_1}, \tilde{\theta}_{k_2}, \ldots, \tilde{\theta}_{k_{N_{SP}}}]^T,$$

$k = [k_1, k_2, \ldots, k_{N_{SP}}]^T$ is set, 1 expresses an all-1 vector with a size $N_{SP} \times 1$, then $$\tilde{\theta} = \frac{2\pi}{N_{FFT}} \tilde{\omega} k + \tilde{\varphi} 1,$$

$$\left| \tilde{\theta} - \frac{2\pi}{N_{FFT}} \tilde{\omega} k - \tilde{\varphi} 1 \right|^2 = \left( \tilde{\theta} - \frac{2\pi}{N_{FFT}} \tilde{\omega} k - \tilde{\varphi} 1 \right)^T \left( \tilde{\theta} - \frac{2\pi}{N_{FFT}} \tilde{\omega} k - \tilde{\varphi} 1 \right)$$

is minimized according to the least squares criterion, partial derivatives of $\tilde{\omega}$ and $\tilde{\omega}$ are respectively figured out, and a partial derivative formula is set to be equal to 0, and thus a sampling frequency deviation estimation value $\tilde{\omega}$ and a residual phase deviation estimation value $\tilde{\omega}$ in one OFDM symbol are respectively:

$$\tilde{\omega}' = \frac{N_{FFT}}{2\pi} \frac{N_{SP} k^T \tilde{\theta} - \tilde{\theta}^T 1 k^T 1}{N_{SP} k^T k - (k^T 1)^2} \quad (3)$$

$$\tilde{\varphi}' = (\tilde{\theta}^T 1 - \tilde{\omega}' k^T 1) / N_{SP}$$

wherein, $(\cdot)^T$ expresses figuring out transposition, and $(\cdot)^2$ expresses figuring out a square;

$$k_i = \left( i - \frac{N_{SP} + 1}{2} \right) d$$

is substituted in the formula 3 to obtain an estimated sampling frequency deviation and an estimated residual phase deviation, which are expressed by the pilot frequency interval d:

$$\tilde{\omega}' = \quad (4)$$

$$\frac{N_{FFT}}{2\pi} \frac{1}{d} \frac{N_{SP} \sum_{i=1}^{N_{SP}} \tilde{\theta}_{k_i} \left( i - \frac{N_{SP}+1}{2} \right) - N_{SP} \sum_{i=1}^{N_{SP}} \tilde{\theta}_{k_i} \sum_{i=1}^{N_{SP}} \left( i - \frac{N_{SP}+1}{2} \right)}{N_{SP} \sum_{i=1}^{N_{SP}} \left( i - \frac{N_{SP}+1}{2} \right)^2 - \left( \sum_{i=1}^{N_{SP}} \left( i - \frac{N_{SP}+1}{2} \right) \right)^2}$$

$$\tilde{\varphi}' = \left( \sum_{i=1}^{N_{SP}} \tilde{\theta}_{k_i} - \frac{2\pi}{N_{FFT}} \tilde{\omega}' \sum_{i=1}^{N_{SP}} \left( i - \frac{N_{SP}+1}{2} \right) d \right) / N_{SP}$$

moreover, the pilot frequency positions are symmetrically distributed about 0, namely $$\sum_{i=1}^{N_{SP}} \left( i - \frac{N_{SP}+1}{2} \right) = 0,$$

and the formula 4 is simplified into $$\tilde{\omega}' = \frac{N_{FFT}}{2\pi} \frac{1}{d} \sum_{i=1}^{N_{SP}} \tilde{\partial}_{k_i}\left(i - \frac{N_{SP}+1}{2}\right) / \sum_{i=1}^{N_{SP}} \left(i - \frac{N_{SP}+1}{2}\right)^2 \quad (5)$$

$$\tilde{\varphi}' = \sum_{i=1}^{N_{SP}} \tilde{\partial}_{k_i} / N_{SP}.$$

As a further optimized solution of the present invention, the expression of the pilot frequency interval $\hat{d}$ for ensuring the minimum normalized mean squared error of the sampling frequency deviations in step 4 is:

$$\hat{d} = \operatorname{argmin}\{E[|\tilde{\omega}' - \tilde{\omega}|^2] / E[\tilde{\omega}^2]\}$$

wherein, arg min{·}expresses a parameter value ensuring a minimum value in the brackets, |·| expresses taking an absolute value, E[·] expresses expectation, and $E[|\tilde{\omega}-\omega|^2]/E[\tilde{\omega}^2]$ expresses the normalized mean squared errors of the sampling frequency deviations.

On another aspect, the present invention further provides a transceiver device of a related pilot frequency module in a wireless system, including a transmitter and a receiver, wherein the transmitter includes a pilot frequency position optimization module and a pilot frequency insertion module, and the receiver includes a phase tracking module and a pilot frequency removal module;

the pilot frequency position optimization module is used for optimizing a pilot frequency position sequence by simulation according to the pilot frequency position determining method based on pilot frequency interval optimization of claim 1 on the premise of symmetrically inserting pilot frequencies at equal intervals;

the pilot frequency insertion module is used for inserting pilot frequency for zero filling to obtain a complete OFDM symbol to constitute a spatial data flow output according to the pilot frequency position sequence obtained by the pilot frequency position optimization module;

the phase tracking module is used for carrying out least squares on sampling frequency deviations and residual phase deviations estimated by the pilot frequency position optimization module to estimate an estimated sampling frequency deviation and an estimated residual phase deviation of each OFDM symbol, and removing the sampling frequency deviation and the residual phase deviation of each OFDM symbol; and the pilot frequency removal module is used for removing pilot frequency subcarriers and null subcarriers according to the pilot frequency position sequence obtained by the pilot frequency position optimization module to obtain the spatial data flow output that only contains data.

Since the above technical solutions of the present invention are adopted, compared with the prior art, the pilot frequency position determining method based on pilot frequency interval optimization provided by the present invention is adopted to reduce the normalized mean squared errors of the sampling frequency deviations without increasing the system overhead, that is, the estimation of the sampling frequency deviations is more accurate, and simulation results indicate that the frame error rate of the system is reduced and the performance is improved.

DETAILED DESCRIPTION

The technical solutions of the present invention will be illustrated below in detail in combination with the accompany drawings. Commonly used technical terms in the field involved in the present invention are shown in the following table.

| Technical terms | English | Chinese |
| --- | --- | --- |
| NMSE | Normalized Mean Squared Error | Normalized Mean Squared Error |
| QAM | Quadrature Amplitude Modulation | Quadrature Amplitude Modulation |
| OFDM | Orthogonal Frequency Division Multiplexing | Orthogonal Frequency Division Multiplexing |
| BPSK | Binary Phase Shift Keying | Binary Phase Shift Keying |
| MIMO | Multiple-Input Multiple-output | Multiple-Input Multiple-output |
| SISO | Single-Input Single-Output | Single-Input Single-Output |

Figure 1:
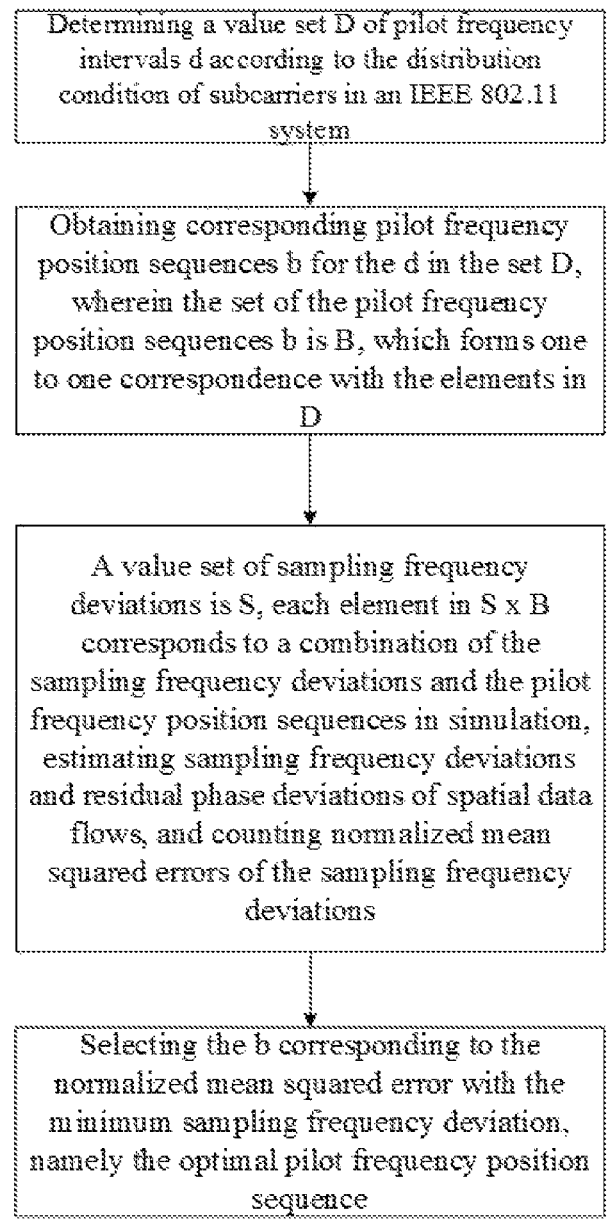
FIG. 1 is a flowchart of a pilot frequency position determining method based on pilot frequency interval optimization.
Figure 2:
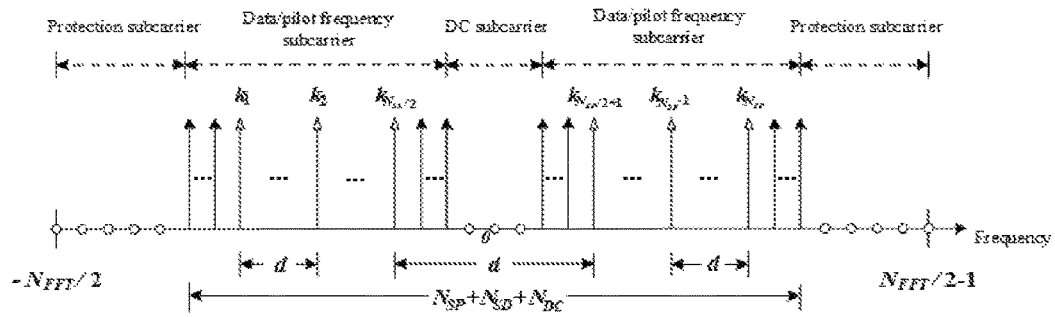
FIG. 2 is a schematic diagram of distribution of a position sequence of pilot frequency subcarriers.

The present invention designs a pilot frequency position determining method based on pilot frequency interval optimization, as shown in FIG. 1, including the following steps:

step 1, determining a value set of pilot frequency intervals according to the distribution condition of subcarriers in an IEEE 802.11 system, specifically:

obtaining the value set D={$d_1$, $d_2$, . . . , $d_m$} of pilot frequency intervals d within a value range $$\left\{d \mid N_{DC}+1 \le d \le \left\lfloor \frac{N_{SP}+N_{SD}+N_{DC}-1}{N_{SP}-1} \right\rfloor, d \bmod 2 = 0\right\},$$

wherein $d_t$ expresses a pilot frequency subcarrier interval, t=1,2, . . . , m , and m expresses the number of elements of the set D; $N_{DC}$ expresses the number of DC null subcarriers, $N_{SP}$ expresses the number of pilot frequency subcarriers, and $N_{SD}$ expresses the number of data subcarriers in each OFDM symbol; $\lfloor \cdot \rfloor$ expresses round down; and mod 2 expresses a remainder of dividing 2;

step 2, obtaining corresponding pilot frequency position sequences and a set thereof for the pilot frequency intervals in the value set of pilot frequency intervals in step 1, specifically:

expressing a pilot frequency subcarrier position $k_i$ by the pilot frequency interval d on the condition that pilot frequencies are symmetrically distributed on a subcarrier sequence at equal intervals as $$k_i = \left(i - \frac{N_{SP}+1}{2}\right)d,$$

i=1, 2, ..., $N_{SP}$, as shown in FIG.2, and then obtaining a corresponding pilot frequency position sequence $b_t = [k_1, k_2, \ldots, k_{N_{SP}}]$ for $\forall d_t \in D$, wherein the pilot frequency position sequence set is $B = \{b_1, b_2, \ldots, b_m\}$, and the number of elements of the set B is equal to the number of the elements of the set D;

step 3, obtaining a direct product of the value set of pilot frequency deviations and the pilot frequency position sequence set in step 2, estimating sampling frequency deviations and residual phase deviations of spatial data flows, and counting normalized mean squared errors of the sampling frequency deviations, specifically:

setting the value set of the sampling frequency deviations $\tilde{\omega}$ as $S = \{s_1, s_2, \ldots, s_n\}$, wherein $S_1$ expresses a random value of $\omega$ on Gaussian distribution in which a mean is 0 and a variance is $\sigma^2$, the value range of $\tilde{\omega}$ is $[-\frac{1}{2}, \frac{1}{2}]$ n expresses the number of the elements of the set S, and l=1,2, ... n; the direct product of S and B is expressed as $S \times B = \{(s_l, b_t) | \forall s_l \in S \sqcap \forall b_t \in B\}$, and then each element in $S \times B$ corresponds to a combination of a sampling frequency deviations and a frequency position sequence selected in simulation, estimating the sampling frequency deviations and the residual phase deviations of the spatial data flows, and counting the normalized mean squared errors of the sampling frequency deviations; and step 4, selecting a pilot frequency interval which ensures a minimum normalized mean squared error of the sampling frequency deviations in step 3 from the value set D of pilot frequency intervals in step 1, wherein the pilot frequency position sequence in the pilot frequency position sequence set B corresponding to the pilot frequency interval is an optimal pilot frequency position sequence.

The specific embodiments of the present invention will be further illustrated in detail in combination with the accompany drawing with a millimeter wave wireless local area network IEEE 802.11 aj (45 GHz) as an example. It should be understood that these embodiments are merely used for illustrating the present invention rather than limiting the scope of the present invention, and modifications in various equivalent forms made by those skilled in the art to the present invention after reading the present invention shall all fall within the scope of the appended claims.

In the embodiment of the present invention, the IEEE 802.11 aj (45 GHz) supports two bandwidths 540 MHz and 1080 MHz, and the bandwidth 540 MHz is taken as an example. In the 540 MHz bandwidth, there are 256 subcarriers in total, $N_{SD}$=168 data subcarriers, $N_{SP}$=8 pilot subcarriers, 39 null subcarriers at a low frequency end, 38 null subcarriers at a high frequency end, and $N_{DS}$=3 DC null subcarriers. Specific simulation parameter configuration is as shown in table 1.

TABLE 1 simulation parameter setting

| Parameter | Value |
|---|---|
| Antenna number | 1 × 1 |
| Flow induced | 1 |
| Bandwidth | 540 MHz |
| Multipath delay spread | 50-60 ns |
| Distinguishable number finding | 18 |
| Low density parity check coding degree | 672 bits |
| Channel implementation time | 10000 |

With 540 MHz bandwidth and 64 QAM modulation mode and ½ code rate as an example, the specific flows of the pilot frequency position determining method based on pilot frequency interval optimization are as follows:

step 1, the value set D={$d_1, d_2, \ldots, d_m$} of pilot frequency intervals d is obtained within a value range $$\left\{d \;\middle|\; N_{DC}+1 \leq d \leq \left\lfloor \frac{N_{SP}+N_{SD}+N_{DC}-1}{N_{SP}-1} \right\rfloor, d \bmod 2 = 0\right\}.$$

In the embodiment, the value range of the pilot frequency intervals d is {d|4≤d≤25, d mod 2=0}, and then the value set thereof is D={4, 6, 8,10,12,14,16,18, 20, 22, 24}.

Step 2, the pilot frequency subcarrier position $k_i$ is expressed by the pilot frequency interval d as $$k_i = \left(i - \frac{N_{SP}+1}{2}\right)d,$$

then the corresponding pilot frequency position sequence $b_t = [k_1, k_2, \ldots, k_{N_{SP}}]$ is obtained for $\forall d_t \in D$, and the pilot frequency position sequence set is $B = \{b_1, b_2, \ldots, b_m\}$.

In the embodiment, the correspondingly obtained pilot frequency position sequences can be expressed as [±1/2d, ±3/2d,±5/2d,±7/2d ], and the pilot frequency position sequence set is B={[±2, ±6, ±10, ±14], ... ,[±12, ±36, ±60, ±84]}.

Step 3, the value set of the sampling frequency deviations $\tilde{\omega}$ is set as $S = \{s_1, s_2, \ldots, s_n\}$, a direct product of S and B is expressed as $S \times B = \{(s_l, b_t) | \forall s_l \in S \sqcap \forall b_t \in B\}$, then each element in $S \times B$ corresponds to a combination of a sampling frequency deviation and a frequency position sequence selected in simulation, the sampling frequency deviations and the residual phase deviations of the spatial data flows are estimated, and the normalized mean squared errors of the sampling frequency deviations are counted.

Step 4, the pilot frequency interval which ensures the minimum normalized mean squared error of the sampling frequency deviations is selected from the set D, and the pilot frequency position sequence in the pilot frequency position sequence set B corresponding to the pilot frequency interval is the optimal pilot frequency position sequence.

In the embodiment, in the case that the residual phase deviations on the frames obey (0, ½) Gaussian distribution within a range of [−π/6,π/6], 6 conditions of pre-added sampling frequency deviations on OFDM symbols are simulated:

1. obeying the (0, 1/24) Gaussian distribution within the range of [−1/8, 1/8];
2. obeying the (0, 1) Gaussian distribution within the range of [−1/8, 1/8];
3. obeying the (0, 1/12) Gaussian distribution within the range of [−1/4, 1/4];
4. obeying the (0, 1) Gaussian distribution within the range of [−1/4, 1/4];
5. obeying the (0, 1/6) Gaussian distribution within the range of [−1/2, 1/2]; and
6. obeying the (0, 1) Gaussian distribution within the range of [−1/2, 1/2].

Figure 3:
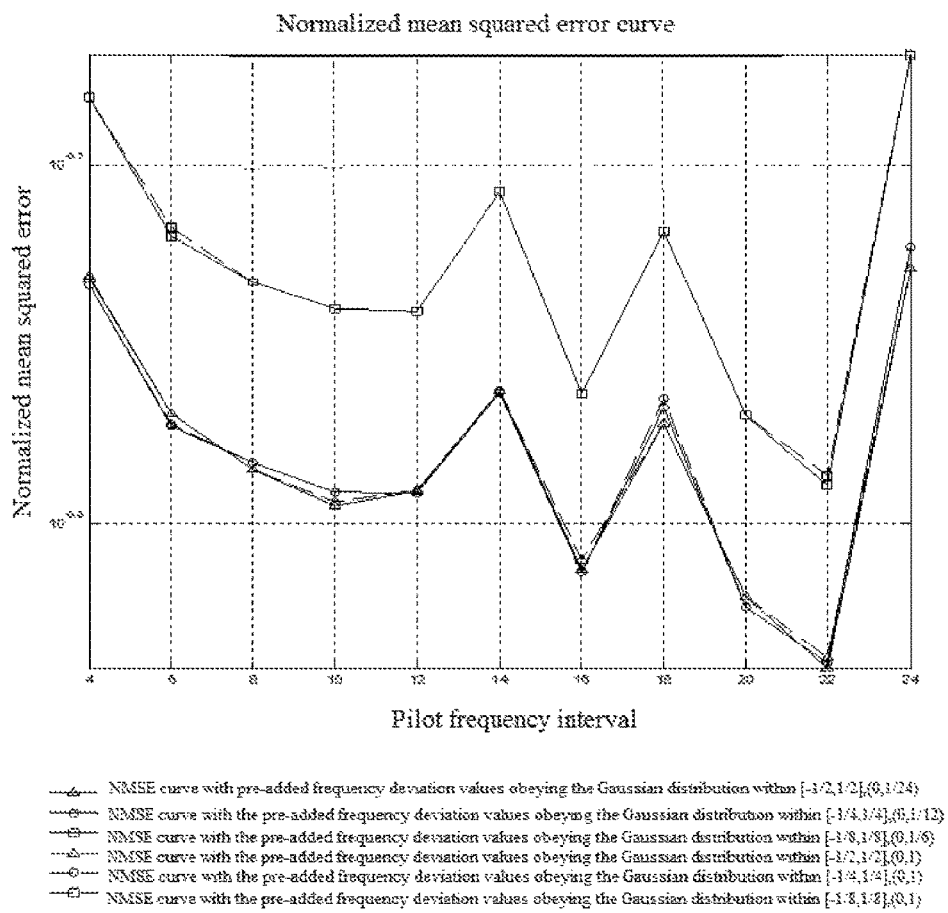
FIG. 3 is an NMSE curve at a 540 MHz bandwidth, wherein 64 QAM modulation, ½ code rate, antenna configuration 1×1 and one flow are adopted, a signal to noise ratio is 20 dB, and a frame length is 4096 bytes.
Figure 4:
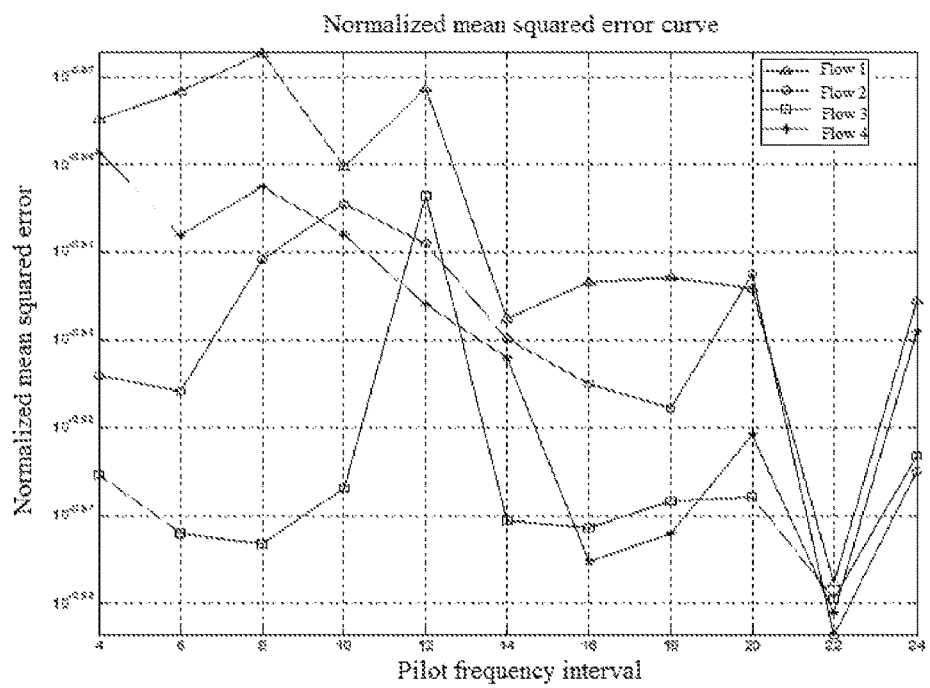
FIG. 4 is an NMSE curve at a 540 MHz bandwidth, wherein 64 QAM modulation, ½ code rate, antenna configuration 4×4 and 4 flows are adopted, the signal to noise ratio is 27 dB, and the frame length is 4096 bytes.
Figure 5:
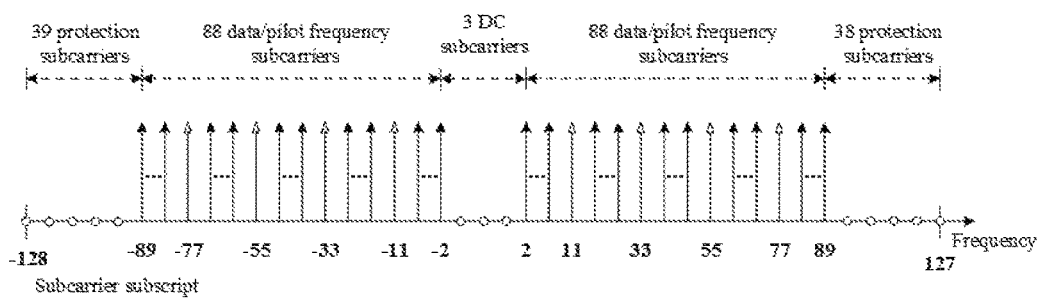
FIG. 5 shows a subcarrier distribution condition in one OFDM symbol in an embodiment of the present invention.

It can be seen from a simulation result FIG. 3 that the optimal pilot frequency position sequence is independent of the magnitude and variance of the pre-added sampling frequency deviation, and an optimal value is obtained at d=22. In order to facilitate comparison in one figure, an NMESE curve corresponding to the Gaussian distribution within the range [−1/8, 1/8] of the pre-added sampling frequency deviation in FIG. 3 is 10 times as large as a simulation value. As shown in FIG. 3 and FIG. 4, the lowest point of each of all the NMESE curves is at d=22 in the case of SISO and MIMO and is the optimal pilot frequency interval that can be selected in the system, at this time, the pilot frequency subcarrier sequence is {±11, ±33, ±55, ±77}, and the position distribution is as shown in FIG. 5.

Figure 6:
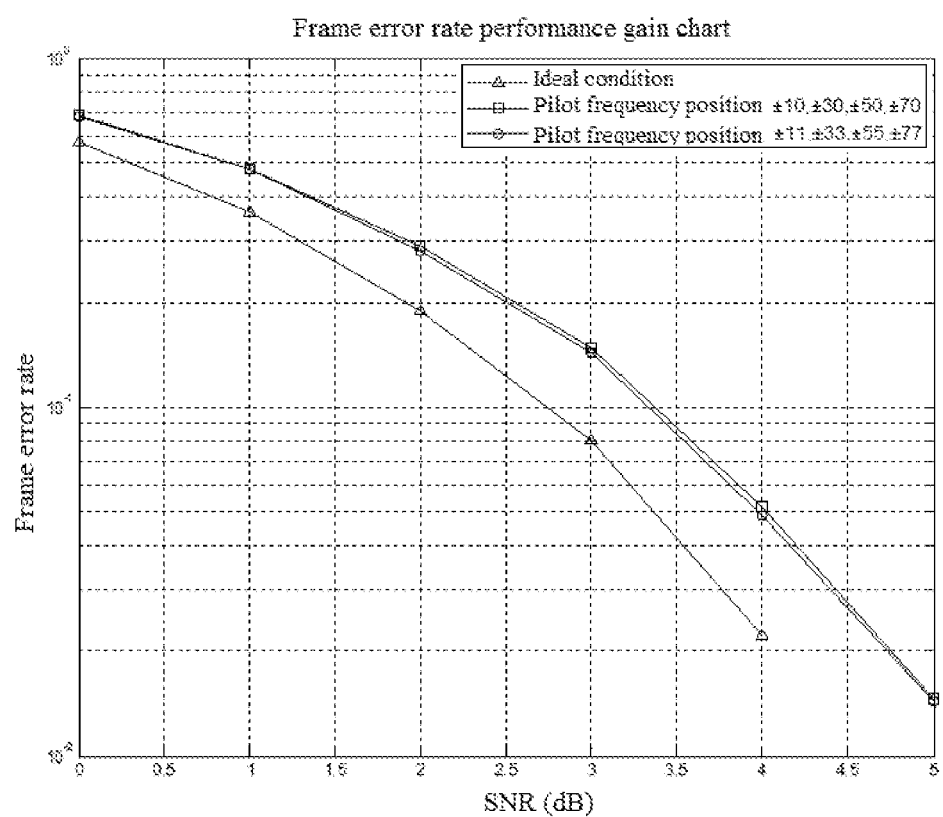
FIG. 6 is a frame error rate performance gain chart of a pilot frequency position obtained by the method in the present invention at a 540 MHz bandwidth and a traditional pilot frequency position, wherein BPSK modulation, ½ code rate, antenna configuration 1×1 and one flow are adopted, and the frame length is 4096 bytes.
Figure 7:
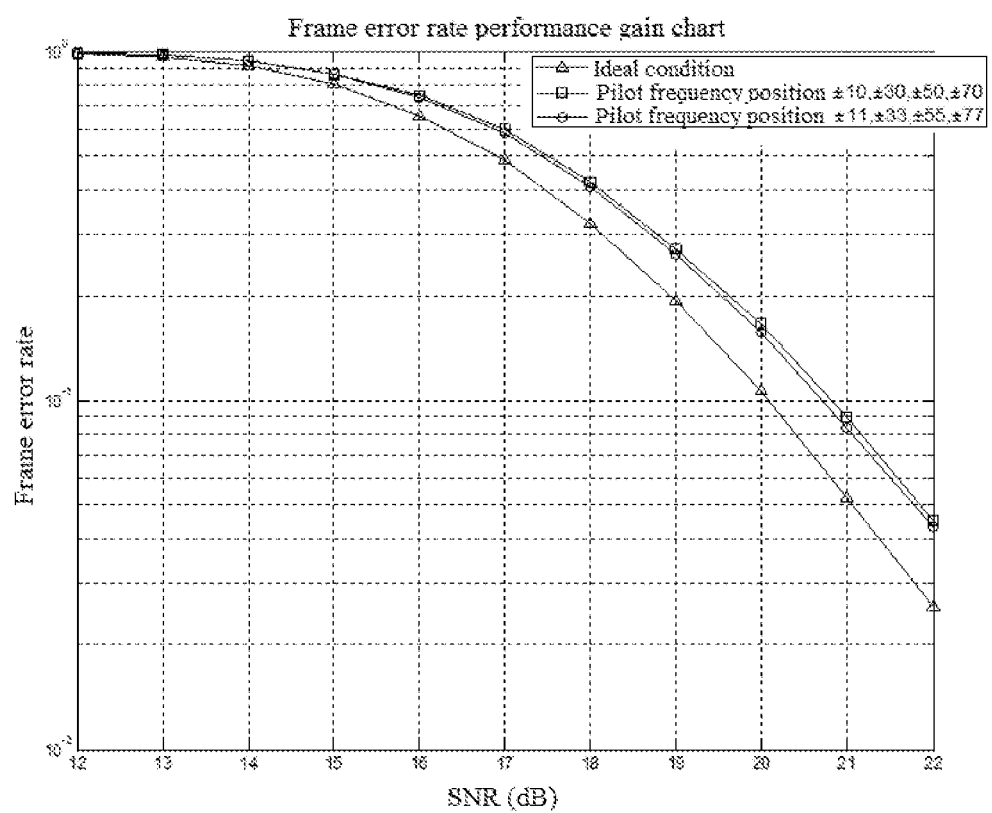
FIG. 7 is a frame error rate performance gain chart of a pilot frequency position obtained by the method in the present invention at a 540 MHz bandwidth and the traditional pilot frequency position, wherein 64 QAM modulation, ½ code rate, antenna configuration 1×1 and one flow are adopted, and the frame length is 4096 bytes.

In order to compare the performance difference between the pilot frequency position obtained by the method provided by the present invention and the traditional pilot frequency position, a performance comparison chart with the traditional pilot frequency position is also provided in the present embodiment. In this embodiment, the performance of the present invention is illustrated by comparison by taking a spatial flow, a BPSK modulation mode and a 64 QAM modulation mode and a code rate ½ at the 540 MHz bandwidth as an example, which is specifically as shown in FIG. 6 and FIG. 7. FIG. 6 is a frame error rate performance gain chart of the pilot frequency position obtained by the method in the present invention at the 540 MHz bandwidth and the traditional pilot frequency position, wherein binary phase shift keying (Binary Phase Shift Keying, BPSK) modulation, antenna configuration 1×1 and one flow are adopted, and the frame length is 4096 bytes; and FIG. 7 is a performance gain chart of the pilot frequency position obtained by the method in the present invention at the 540 MHz bandwidth and the traditional pilot frequency position, wherein 64 QAM modulation, antenna configuration 1×1 and one flow are adopted, and the frame length is 4096 bytes. Therefore, the pilot frequency position obtained by the pilot frequency position method provided by the present invention is better than the traditional pilot frequency position.

The present invention further designs a transceiver device of a related pilot frequency module in a wireless system, including a transmitter and a receiver, wherein the transmitter includes a pilot frequency position optimization module and a pilot frequency insertion module, and the receiver includes a phase tracking module and a pilot frequency removal module;

the pilot frequency position optimization module is used for optimizing a pilot frequency position sequence by simulation according to the pilot frequency position determining method based on pilot frequency interval optimization on the premise of symmetrically inserting pilot frequencies at equal intervals;

the pilot frequency insertion module is used for inserting pilot frequency for zero filling to obtain a complete OFDM symbol to constitute a spatial data flow output according to the pilot frequency position sequence obtained by the pilot frequency position optimization module;

the phase tracking module is used for carrying out least squares on sampling frequency deviations and residual phase deviations estimated by the pilot frequency position optimization module to estimate an estimated sampling frequency deviation and an estimated residual phase deviation of each OFDM symbol, and removing the sampling frequency deviation and the residual phase deviation of each OFDM symbol according to the deviations; and the pilot frequency removal module is used for removing pilot frequency subcarriers and null subcarriers according to the pilot frequency position sequence obtained by the pilot frequency position optimization module to obtain the spatial data flow output that only contains data.

According to the method for optimizing the pilot frequency position based on the pilot frequency intervals, the position where the pilot frequency needs to be inserted in the system is set, and the pilot frequency position obtained by optimization is fixed in the system and is known to the transceiver device of the related pilot frequency module in the wireless system. In the embodiment, the pre-added sampling frequency deviations on the OFDM symbols obey the (0, 1/24) Gaussian distribution within the range of [−1/8, 1/8], and the pilot frequencies are distributed at {±11, ±33, ±55, ±77}.

Transmitting and receiving steps of the related pilot frequency module in the wireless system are as follows:

step 1: converting each spatial data flow into a matrix form with a size of $N_{SYM} \times N_{SD}$ according to rows, wherein each row only contains data in one OFDM symbol, matrix column sequence numbers are sequentially arranged from positive to negative and small to large of carrier mark numbers, $N_{SYM}$ expresses the number of the OFDM symbols contained in each spatial data flow, and $N_{SD}$ expresses the number of the data subcarriers of one OFDM symbol corresponding to a corresponding bandwidth; in the embodiment, $N_{SYM}=66$;

step 2: operating the matrix according to the rows, inserting the pilot frequency at the pilot frequency position obtained by optimization, carrying out zero filling at a corresponding position of each row according to the number and positions of required null subcarriers in the system, wherein the data on the original position moves backward in sequence, the column sequence numbers are sequentially arranged from positive to negative and small to large of the carrier mark numbers, a subcarrier mark number $$0 \square \frac{N_{FFT}}{2} - 1$$

corresponds to the column sequence number $$0 \square \frac{N_{FFT}}{2} - 1,$$

and the subcarrier mark number $$-\frac{N_{FFT}}{2} \square - 1$$

corresponds to the column sequence number $$\frac{N_{FFT}}{2} \Box N_{FFT} - 1.$$

At this time, each row of the matrix is a complete OFDM symbol, and the size of the matrix is $N_{SYM} \times N_{FFT}$;

step 3: converting the matrix form with the size of $N_{SYM} \times N_{FFT}$ into the spatial data flow with the size of $1 \times (N_{SYM} \times N_{FFT})$ according to rows;

step 4: operating each spatial data flow by the receiving terminal after receiving the spatial data flows, and converting the spatial data flow into the matrix form with the size of $N_{SYM} \times N_{FFT}$ according to rows;

step 5: operating each OFDM symbol according to rows, estimating a frequency deviation value and a phase deviation value at each pilot frequency, estimating and removing a frequency deviation value and a phase deviation value in one OFDM symbol according to the formula 7, wherein the size of the matrix is $N_{SYM} \times N_{FFT}$ at the moment;

step 6: operating each OFDM symbol according to rows, removing the pilot frequencies and null carriers at corresponding positions, and moving the data forward in sequence to fill the null positions, wherein the size of the matrix is $N_{SYM} \times N_{SD}$; and step 7: converting the matrix form with the size of $N_{SYM} \times N_{SD}$ into spatial data flows with lengths of $1 \times (N_{SYM} \times N_{SD})$ according to rows.

The foregoing descriptions are merely specific embodiments in the present invention, but the protection scope of the present invention is not limited thereto. Variations or substitutions that can be understood and thought by anyone who is familiar with this art without the technical scope disclosed by the present invention shall fall within the scope of the present invention, and thus the protection scope of the claims prevail over the protection scope of the present invention.

The invention claimed is:

1. A pilot frequency position determining method based on pilot frequency interval optimization, comprising the following steps:

step 1, determining a value set of pilot frequency intervals according to the distribution condition of subcarriers in an IEEE 802.11 system;

step 2, obtaining corresponding pilot frequency position sequences and a set thereof for the pilot frequency intervals in the value set of pilot frequency intervals in step 1;

step 3, obtaining a direct product of the value set of pilot frequency deviations and the pilot frequency position sequence set in step 2, estimating sampling frequency deviations and residual phase deviations of spatial data flows, and counting normalized mean squared errors of the sampling frequency deviations; and step 4, selecting a pilot frequency interval which ensures a minimum normalized mean squared error of the sampling frequency deviations in step 3 from the value set of pilot frequency intervals in step 1, wherein the pilot frequency position sequence in the pilot frequency position sequence set corresponding to the pilot frequency interval is an optimal pilot frequency position sequence.

2. The pilot frequency position determining method based on pilot frequency interval optimization of claim 1, comprising the following specific steps:

step 1, determining the value set of pilot frequency intervals according to the distribution condition of the subcarriers in the IEEE 802.11 system, specifically comprises:

obtaining the value set $D=\{d_1, d_2, \ldots, d_m\}$ of pilot frequency intervals d within a value range $$\left\{ d \mid N_{DC}+1 \leq d \leq \left\lfloor \frac{N_{SP}+N_{SD}+N_{DC}-1}{N_{SP}-1} \right\rfloor, d \bmod 2 = 0 \right\},$$

wherein $d_t$ expresses a pilot frequency subcarrier interval $t=1, 2, \ldots, m$, and m expresses the number of elements of the set D; $N_{DC}$ expresses the number of DC null subcarriers, $N_{SP}$ expresses the number of pilot frequency subcarriers, and $N_{SD}$ expresses the number of data subcarriers in each OFDM symbol; $\lfloor \cdot \rfloor$ expresses round down; and mod2 expresses a remainder of dividing 2;

step 2, obtaining the corresponding pilot frequency position sequences and the set thereof for the pilot frequency intervals in the value set of pilot frequency intervals in step 1, specifically comprises:

expressing a pilot frequency subcarrier position ki by the pilot frequency interval d on the condition that pilot frequencies are symmetrically distributed on a subcarrier sequence at equal intervals as $$k_i = \left(i - \frac{N_{SP}+1}{2}\right)d,$$

$i=1,2, \ldots, N_{SP}$, and then obtaining a corresponding pilot frequency position sequence $b_t=[k_1, k_2, \ldots, k_{N_{SP}}]$ for $\forall d_t \in D$, wherein the pilot frequency position sequence set is $B=\{1, b_2, \ldots, b_m\}$, and the number of elements of the set B is equal to the number of the elements of the set D;

step 3, obtaining the direct product of the value set of pilot frequency deviations and the pilot frequency position sequence set in step 2, estimating the sampling frequency deviations and the residual phase deviations of the spatial data flows, and counting the normalized mean squared errors of the sampling frequency deviations, specifically comprises:

setting the value set of the sampling frequency deviations $\tilde{\omega}$ as $S=\{s_1, s_2, \ldots, s_n\}$, wherein $s_l$ expresses a random value of $\omega$ on Gaussian distribution in which a mean is 0 and a variance is $\sigma^2$, the value range of $\tilde{\omega}$ is $[-\frac{1}{2}, \frac{1}{2}]$, n expresses the number of the elements of the set S, and $l=1, 2, \ldots n$; the direct product of S and B is expressed as $S \times B = \{(s_l, b_t) | \forall s_l \in S \text{ H } \forall b_t \in B\}$ and then each element in $S \times B$ corresponds to a combination of a sampling frequency deviation and a frequency position sequence selected in simulation, estimating the sampling frequency deviations and the residual phase deviations of the spatial data flows, and counting the normalized mean squared errors of the sampling frequency deviations; and step 4, selecting the pilot frequency interval which ensures the minimum normalized mean squared error of the sampling frequency deviations in step 3 from the value set D of pilot frequency intervals in step 1, wherein the pilot frequency position sequence in the pilot frequency position sequence set B corresponding to the pilot frequency interval is the optimal pilot frequency position sequence.

3. The pilot frequency position determining method based on pilot frequency interval optimization of claim 2, wherein the estimating the sampling frequency deviations and the residual phase deviations of the spatial data flows in step 3 is specifically as follows:

on the condition of not considering noise influence, the pilot frequency sequence sent by a transmitting terminal is set as $$x = [x_{k_1}, \ldots x_{k_i} \ldots, x_{k_{N_{SP}}}],$$

and the pilot frequency sequence received by a receiving terminal is set as $$y = [y_{k_1}, \ldots y_{y_i} \ldots, y_{k_{N_{SP}}}],$$

wherein $k_i$ expresses a pilot frequency subcarrier position, namely the corresponding position of the $i^{th}$ pilot frequency is the $k^{th}$ subcarrier, $h_{k_i}$ expresses a corresponding frequency domain channel, and then a model of the sampling frequency deviation $\tilde{\omega}$ and the residual phase deviation $\tilde{\varphi}$ on the $k_i^{th}$ pilot frequency subcarrier is as follows:

$$y_{k_i} = h_{k_i} x_{k_i} e^{j\left(\frac{2\pi}{N_{FFT}} \tilde{\omega} k_i + \tilde{\varphi}\right)}, i = 1, 2, \ldots, N_{SP} \quad (1)$$

wherein, $N_{FFT}$ expresses the number of subcarriers in one OFDM symbol; j is an imaginary number;
after channel equalization, the phase deviation obtained by coherent detection at the pilot frequency subcarrier is:

$$\tilde{\theta}_{k_i} = \angle(h_{k_i}^{-1} y_{k_i} x_{k_i}^*) \ i=1, 2, \ldots, N_{SP} \quad (2)$$

wherein, $$\tilde{\theta}_{k_i} = \frac{2\pi}{N_{FFT}} \tilde{\omega} k_i + \tilde{\varphi},$$

$\angle$ expresses figuring out a phase value, $(\cdot)^{-1}$ expresses inversion, and $(\cdot)^*$ expresses figuring out conjugation;
for $N_{SP}$ pilot frequency subcarriers, $$\tilde{\theta} = [\tilde{\theta}_{k_1}, \tilde{\theta}_{k_2}, \ldots, \tilde{\theta}_{k_{N_{SP}}}]^T,$$

$k=[k_1, k_2, \ldots, k_{N_{SP}}]^T$ is set, 1 expresses an all-1 vector with a size $N_{SP} \times 1$, then:

$$\tilde{\theta} = \frac{2\pi}{N_{FFT}} \tilde{\omega} k + \tilde{\varphi} 1,$$

$$\left|\tilde{\theta} - \frac{2\pi}{N_{FFT}} \tilde{\omega} k - \tilde{\varphi} 1\right|^2 = \left(\tilde{\theta} - \frac{2\pi}{N_{FFT}} \tilde{\omega} k - \tilde{\varphi} 1\right)^T \left(\tilde{\theta} - \frac{2\pi}{N_{FFT}} \tilde{\omega} k - \tilde{\varphi} 1\right)$$

is minimized according to the least squares criterion, partial derivatives of $\tilde{\omega}$ and $\tilde{\varphi}$ are respectively figured out, and a partial derivative formula is set to be equal to 0, and thus a sampling frequency deviation estimation value $\tilde{\omega}'$ and a residual phase deviation estimation value $\tilde{\varphi}'$ in one OFDM symbol are respectively:

$$\tilde{\omega}' = \frac{N_{FFT}}{2\pi} \frac{N_{SP} k^T \tilde{\theta} - \tilde{\theta}^T 1 k^T 1}{N_{SP} k^T k - (k^T 1)^2} \quad (3)$$

$$\tilde{\varphi}' = (\tilde{\theta}^T 1 - \tilde{\omega}' k^T 1)/N_{SP}$$

wherein, $(\cdot)^T$ expresses figuring out transposition, and $(\cdot)^2$ expresses figuring out a square;

$$k_i = \left(i - \frac{N_{SP}+1}{2}\right) d$$

is substituted in the formula 3 to obtain an estimated sampling frequency deviation and an estimated residual phase deviation, which are expressed by the pilot frequency interval d:

$$\tilde{\omega}' = \quad (4)$$

$$\frac{N_{FFT}}{2\pi} \frac{1}{d} \frac{N_{SP} \sum_{i=1}^{N_{SP}} \tilde{\theta}_{k_i}\left(i - \frac{N_{SP}+1}{2}\right) - N_{SP} \sum_{i=1}^{N_{SP}} \tilde{\theta}_{k_i} \sum_{i=1}^{N_{SP}} \left(i - \frac{N_{SP}+1}{2}\right)}{N_{SP} \sum_{i=1}^{N_{SP}} \left(i - \frac{N_{SP}+1}{2}\right)^2 - \left(\sum_{i=1}^{N_{SP}} \left(i - \frac{N_{SP}+1}{2}\right)\right)^2}$$

$$\tilde{\varphi}' = \left(\sum_{i=1}^{N_{SP}} \tilde{\theta}_{k_i} - \frac{2\pi}{N_{FFT}} \tilde{\omega}' \sum_{i=1}^{N_{SP}} \left(i - \frac{N_{SP}+1}{2}\right) d\right)/N_{SP}$$

moreover, the pilot frequency positions are symmetrically distributed about 0, namely $$\sum_{i=1}^{N_{SP}} \left(i - \frac{N_{SP}+1}{2}\right) = 0,$$

and the formula 4 is simplified into $$\tilde{\omega}' = \frac{N_{FFT}}{2\pi} \frac{1}{d} \sum_{i=1}^{N_{SP}} \tilde{\theta}_{k_i}\left(i - \frac{N_{SP}+1}{2}\right) / \sum_{i=1}^{N_{SP}} \left(i - \frac{N_{SP}+1}{2}\right)^2 \quad (5)$$

$$\tilde{\varphi}' = \sum_{i=1}^{N_{SP}} \tilde{\theta}_{k_i}/N_{SP}.$$

4. The pilot frequency position determining method based on pilot frequency interval optimization of claim 2, wherein the expression of the pilot frequency interval $\hat{d}$ for ensuring the minimum normalized mean squared error of the sampling frequency deviations in step 4 is:

$$\hat{d} = \arg\min \ \{E[|\tilde{\omega}'-\tilde{\omega}|^2]/E[\tilde{\omega}^2]\}$$

wherein, arg min$\{\cdot\}$ expresses a parameter value ensuring a minimum value in the brackets, $|\cdot|$ expresses taking an absolute value, $E[\cdot]$ expresses expectation, and $E[|\tilde{\omega}'-$ $\tilde{\omega}|^2]/E[\tilde{\omega}^2]$ expresses the normalized mean squared errors of the sampling frequency deviations.

5. A transceiver device of a related pilot frequency module in a wireless system, comprising a transmitter and a receiver, wherein the transmitter comprises a pilot frequency position optimization module and a pilot frequency insertion module, and the receiver comprises a phase tracking module and a pilot frequency removal module;

the pilot frequency position optimization module is used for optimizing a pilot frequency position sequence by simulation according to the pilot frequency position determining method based on pilot frequency interval optimization of claim 1 on the premise of symmetrically inserting pilot frequencies at equal intervals;

the pilot frequency insertion module is used for inserting pilot frequency for zero filling to obtain a complete OFDM symbol to constitute a spatial data flow output according to the pilot frequency position sequence obtained by the pilot frequency position optimization module;

the phase tracking module is used for carrying out least squares on sampling frequency deviations and residual phase deviations estimated by the pilot frequency position optimization module to estimate an estimated sampling frequency deviation and an estimated residual phase deviation of each OFDM symbol, and removing the sampling frequency deviation and the residual phase deviation of each OFDM symbol; and the pilot frequency removal module is used for removing pilot frequency subcarriers and null subcarriers according to the pilot frequency position sequence obtained by the pilot frequency position optimization module to obtain the spatial data flow output that only contains data.

\* \* \* \* \*